United States Patent [19]

Rood

[11] 4,441,601

[45] Apr. 10, 1984

[54] PLASTIC CONVEYOR ROLLER AND METHOD OF MAKING SAME

[75] Inventor: William R. Rood, Muskegon, Mich.

[73] Assignee: C. L. Frost & Son, Inc., Grand Rapids, Mich.

[21] Appl. No.: 255,510

[22] Filed: Apr. 20, 1981

[51] Int. Cl.³ ............................................. B65G 39/09
[52] U.S. Cl. ..................................................... 193/37
[58] Field of Search .............. 193/35 R, 37; 29/116 R

[56] References Cited

U.S. PATENT DOCUMENTS

| | | |
|---|---|---|
| 1,092,464 | 4/1914 | Watson et al. . |
| 2,429,293 | 10/1947 | Peck et al. . |
| 3,180,386 | 4/1965 | Bynum . |
| 3,184,353 | 5/1965 | Balamuth et al. . |
| 3,224,916 | 12/1965 | Soloff et al. . |
| 3,349,649 | 10/1967 | Mele . |
| 3,350,921 | 9/1970 | Ernest . |
| 3,353,644 | 11/1967 | McNash et al. . |
| 3,372,960 | 3/1968 | Fisher . |
| 3,461,772 | 8/1969 | Barry . |
| 3,473,363 | 10/1969 | Herman et al. . |
| 3,498,353 | 3/1970 | Barry . |
| 3,602,257 | 8/1971 | Berleyoung et al. . |
| 3,604,765 | 9/1971 | Babcock . |
| 3,623,926 | 11/1971 | Sager . |
| 3,721,481 | 3/1973 | Chenot . |
| 3,750,250 | 8/1973 | Brown . |
| 3,824,138 | 7/1974 | Karobath et al. . |
| 3,834,438 | 9/1974 | Ziaylek, jr. . |
| 3,836,062 | 9/1974 | Tsunoda et al. . |
| 3,881,243 | 5/1975 | Bannon . |
| 3,931,878 | 1/1976 | Payne . |
| 3,996,966 | 12/1976 | Princell . |
| 4,003,665 | 11/1977 | Dreyer et al. . |
| 4,027,370 | 6/1977 | Bachar . |
| 4,046,181 | 9/1977 | Barnsdale . |
| 4,059,294 | 11/1977 | Falcone . |
| 4,078,641 | 3/1978 | Payne . |
| 4,078,642 | 3/1978 | Payne . |
| 4,118,259 | 10/1978 | Bingle et al. . |
| 4,140,058 | 2/1979 | Ballreich et al. . |
| 4,144,109 | 3/1979 | Waligorski . |
| 4,213,523 | 7/1980 | Frost et al. ........................... 193/37 |

FOREIGN PATENT DOCUMENTS

| | | |
|---|---|---|
| 257480 | 4/1964 | Australia . |
| 2740302 | 3/1978 | Fed. Rep. of Germany . |
| 1601493 | 10/1970 | France . |
| 48-197806 | 6/1973 | Japan . |
| 7206781 | 7/1963 | Netherlands . |
| 699295 | 11/1953 | United Kingdom . |
| 976679 | 12/1964 | United Kingdom . |
| 985792 | 3/1965 | United Kingdom . |
| 1018864 | 2/1966 | United Kingdom . |
| 1335841 | 10/1973 | United Kingdom . |
| 1491233 | 11/1977 | United Kingdom . |
| 1504561 | 3/1978 | United Kingdom . |

OTHER PUBLICATIONS

Machine Design, Mar. 16, 1967, Reprint Entitled "Designing Plastic Parts for Ultrasonic Assembly".
Pamphlet Entitled "A Guide to Ultrasonic Plastics Assembly", Branson Instruments, 1973.
Article from Design News, May 5, 1980, Entitled "For a Change, Good Vibrations–Ultrasonic Plastics Assembly".
Catalog Sheets Entitled "Cavitron Ultrasonics Model 150/70PE".

(List continued on next page.)

*Primary Examiner*—Jeffrey V. Nase
*Attorney, Agent, or Firm*—Price, Heneveld, Huizenga & Cooper

[57] ABSTRACT

A roller assembly primarily adapted for sanitary uses includes an amorphous thermoplastic roller tube and crystalline thermoplastic end caps. Each end cap includes a tapered hub and a radial flange. A plurality of tapered barbs are formed on the hub. The end caps and tube are mechanically interconnected by an ultrasonic insertion device which causes melting and resolidifying of the roller tube about the end cap. The roller tube is held and the end cap is guided to a concentric position by a clamp havig a pair of jaws which define a bore. The tube is clamped in the bore during insertion of the end cap.

48 Claims, 18 Drawing Figures

OTHER PUBLICATIONS

Bulletin S-888 of Branson Sonic Power, a Division of Branson Instruments, Inc. Entitled "Ultrasonic Assembly".

Information Sheet PW-4 from Branson Sonic Power Company Entitled "Ultrasonic Inserting & Staking".

Catalog Sheet from Yardley Products Corp. Entitled "Yardley Type H Intro-Sert Inserts".

Catalog Sheet from Groov-Pin Corporation Entitled "The New Barb-Sert".

Catalog Sheet Entitled "Dodge Ultrasert II".

Catalog Sheet from Groov-Pin Advertising Barb-Sert.

Article from Modern Plastics Encyclopedia, 1979-1980, Entitled "Selecting Plastics for Elevated Temperature Performance".

PLASTIC CONVEYOR ROLLER AND METHOD OF MAKING SAME

BACKGROUND OF THE INVENTION

This invention relates to rollers for gravity, push-operated and powered roller conveyors and more particularly to a unique plastic roller assembly which is primarily adapted for use in sanitary or corrosion-free applications.

Sanitary conveying systems are required for the production of food items, chemical products, medical supplies and pharmaceutical goods, and in other industries. These systems should be noncorroding and easily cleanable to remove contaminants. Sanitary conveyor rollers are frequently washed or steam cleaned and are, therefore, subjected to corrosion-inducing fluids and materials.

Various proposals have been made to provide roller assemblies which are easily cleaned and which will not permit the collection of bacteria-forming contaminants. Typically, these systems include a stainless steel or plastic roller which is closed at both ends. The roller is supported by stub shafts or axles which extend inwardly from the side rails of a conveyor support structure.

An example of one such system may be found in commonly owned U.S. patent application Ser. No. 941,176, entitled CONVEYOR ROLLER ASSEMBLY, filed on Sept. 11, 1978, in the names of Charles C. Frost and Siegfried K. Weis and now U.S. Pat. No. 4,213,523, issued on July 22, 1980. The conveyor roller assembly disclosed therein includes a pair of longitudinally extending side supports between which are supported a plurality of plastic roller assemblies. The roller assemblies each include a tubular roller having a hollow interior and planar ends. The open ends of the tubular rollers are closed with circular plugs. The tubular rollers and plugs are formed from an organic resin such as polyvinyl chloride.

The plugs include a cylindrical hub-like portion having an outer diameter closely matched with the inner diameter of the tubular roller to fit tightly therein. The plugs are secured to the roller tube with an adhesive. The plugs are dimensioned to close and seal the ends of the roller assembly to eliminate cracks or crevices into which contaminants may enter and build up.

Each plug also defines a central opening or blind bore within which a bearing insert is disposed. The insert includes a central opening defined by side surfaces which are curved and annular such that the opening is hourglass-shaped in cross section. The insert is fabricated from a low friction polymeric material different from that of the tubular rollers such as a self-lubricating, acetal homopolymer resinous plastic. The rollers are supported on the conveyor cylindrical stub shafts or axles which extend into the insert openings. Another example of prior sanitary roller constructions employing plastic materials may be found in U.S. Pat. No. 3,931,878, entitled SANITARY ROLLER CONVEYOR and issued on Jan. 13, 1976, to Payne.

During the manufacture of sanitary roller assemblies of the aforementioned type, the tubular rollers are typically cut from lengths of extruded tubes. The extruded tubes have a varying wall thickness and hence a non-constant internal diameter due to the manufacturing process by which they are formed. Additional steps, therefore, must be taken to insure that the end plug or end cap is properly fitted into the end of the roller to seal the interior and to obtain a concentric relationship with the tube periphery. Typically, the end of the tube should be bored to a constant, concentric internal diameter and chamfered. Further, adhesives must typically be employed to secure and seal the end plugs to the tubular roller. These steps add to the manufacturing problems experienced and hence to the cost of the completed roller assembly.

A need exists for a roller assembly, components therefor and a method of manufacture which results in a sanitary conveyor roller wherein the attachment of an end cap or closure to the tubular roller is strong, reliable, liquid-tight without openings or crevices which could retain materials for the breeding of bacteria and which permits the rapid, economical and easily accomplished assembly of the rollers by relatively unskilled operators with minimal training.

SUMMARY OF THE INVENTION

In accordance with the present invention, a unique tubular roller, end cap or closure and method are provided whereby the aforementioned needs are satisfied. Essentially, an end cap or closure is provided which is mechanically interconnected to the tubular roller by an ultrasonic insertion process. The end cap includes a molded, thermoplastic body defining an axially extending hub and an outer, radially extending flange. A plurality of tapered, axially spaced barbs extend around the outer peripheral surface of the hub of the end cap. The barbs are positioned between an inner end of the hub and the outer flange to thereby define a plurality of circumferential spaces or grooves. After assembly, the roller defines portions disposed within these grooves in a labyrinth fashion.

In narrower aspects of the invention, the tubular roller is fabricated from an amorphous thermoplastic material and the end cap is fabricated from a crystalline thermoplastic material having a higher and more narrowly defined melting temperature than the melting temperature of the tubular roller. When an ultrasonic insertion device vibrates the end cap, the material at the inner peripheral surface of the roller tube melts. The barbs trap the melting material which will resolidify in the spaces defined between the barbs so that the end cap is mechanically interconnected to the tubular roller and sealed to the tubular roller.

In assembling and manufacturing a sanitary roller assembly in accordance with the present invention, an ultrasonic press is supported in axial alignment with a clamping means. An open end of the roller the is supported within the clamping means and the end cap is placed in the open tube. The press exerts a force on the end cap and transmits ultrasonic vibrations to the cap which results in melting of the tube material. The clamping means centers and guides the end cap into the tube, serves to dissipate heat and prevents localized growth of the tube during the insertion process.

The configuration of the barbs on the end cap and the relative dimensioning of the tubular roller to the end cap insures a strong, crevice-free interconnection between the cap and the tubular roller. The resulting assembly is of relatively high strength, resists thermal expansion and contraction and withstands externally applied loadings. Assembly may be accomplished with significant savings of cost and by relatively unskilled operators. Preparation of the end of the tube, as necessary in prior methods, such as chamfering, deburring and boring the tube interior to a constant, concentric diameter, is eliminated. Accurate centering of the end cap with respect to the tube is achieved so that the roller produced rotates concentrically on its axis with minimal runout.

DETAILED DESCRIPTION OF THE PREFERRED EMBODIMENT

Figure 1:
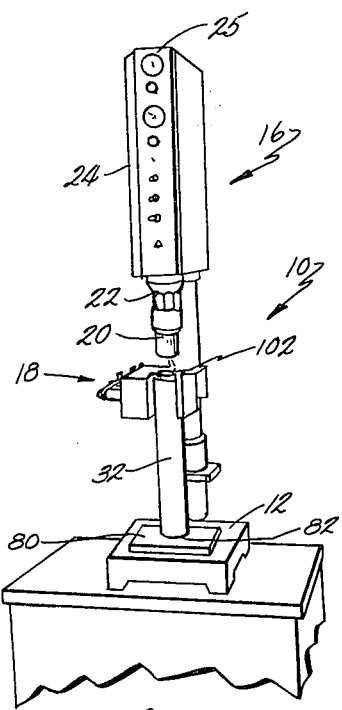
FIG. 1 is a perspective view of apparatus in accordance with the present invention for assembling a roller tube and end cap by ultrasonic insertion.

With reference to the drawings, FIG. 1 illustrates apparatus, generally designated 10, for assembling a conveyor roller in accordance with the present invention. As shown therein, apparatus 10 includes a base 12, an elongated support port 14, an ultrasonic insertion device generally designated 16 and a clamp or holding fixture generally designated 18.

The ultrasonic insertion device 16 is a commercially available item and includes a horn 20, a piezo-electric transducer or electro accoustic converter 22 and a housing or enclosure 24. Supported on the front face of enclosure 24 is a control panel 25 for the insertion device. Transducer 22 is connected to a power supply (not shown).

The transducer receives high frequency electrical energy and converts the energy into mechanical vibrations. The horn or "tool" 20 transmits the mechanical ultrasonic vibrations to the parts which are to be assembled, as explained in detail below.

Supported within enclosure 24 is a fluid actuator which shifts the horn 20 downwardly and applies a constant force or pressure to the work. After a preset period, the actuator automatically returns horn 20 to its initial or start position. Examples of ultrasonic insertion devices may be found in U.S. Pat. No. 4,027,370, entitled HIGH FREQUENCY VIBRATION INSERTION APPARATUS and issued on June 7, 1977, to Bachar; U.S. Pat. No. 3,790,059, entitled ULTRASONIC APPARATUS and issued on Feb. 5, 1974, to Jacke; U.S. Pat. No. 3,524,085, entitled SONIC TRANSDUCER and issued on Aug. 11, 1970, to Shoh; and U.S. Pat. No. 3,586,589, entitled ULTRASONIC TOOL AND STAND and issued on June 22, 1971, to Jugler.

Although an automatic device is preferred in the present invention, a hand wheel type stand could be used to move horn 20 towards the work and apply the required force during the ultrasonic insertion step. An example of a hand wheel operated stand may be found in U.S. Pat. No. 3,184,353, entitled FASTENING TOGETHER OF MEMBERS BY HIGH FREQUENCY VIBRATIONS and issued on May 18, 1965, to Balamuth et al. In a presently existing embodiment of apparatus 10, an ultrasonic insertion device designated Model 150/70PE and sold by Cavitron Ultrasonics, Long Island, New York, is employed.

Figure 5:
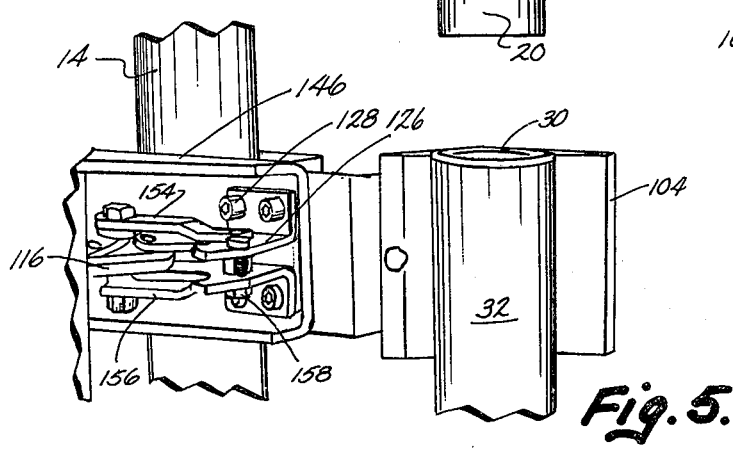
FIG. 5 is a fragmentary, side, elevational view showing the end cap and roller fully assembled after ultrasonic insertion.

Apparatus 10 is adapted to assemble an end cap 30 into the open end of a roller tube 32 (FIG. 5). The method performed by the apparatus results in a mechanical interconnection of the end cap with the roller tube. Preferably, roller tube 32 is extruded or otherwise formed from an amorphous thermoplastic material. It is presently preferred that the tube be formed from a high impact, high gloss ABS material such as that sold by Borg-Warner Corporation under the brand name Cycolac ABS, Grade GSE. This material has a softening temperature of approximately 270° F. yet is suitable for service temperatures in use up to 200° F. and can sustain limited exposure to 212° F. As a result, the roller tube may be cleaned with boiling water. Such material also has the requisite strength and chemical resistance characteristics for use in sanitary environments. It should be understood, however, that other amorphous thermoplastics, such as polyvinyl chloride, may be used for the roller tube 32.

END CAPS

Figure 6:
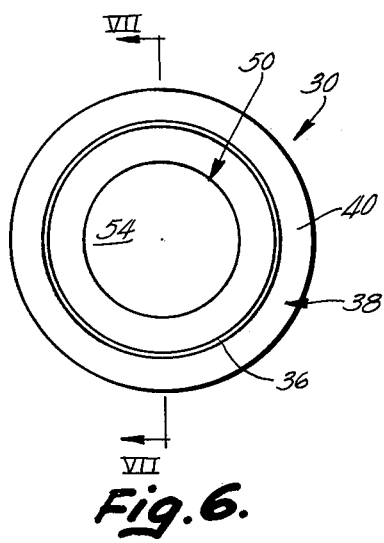
FIG. 6 is a rear, elevational view of an end cap in accordance with the present invention.
Figure 7:
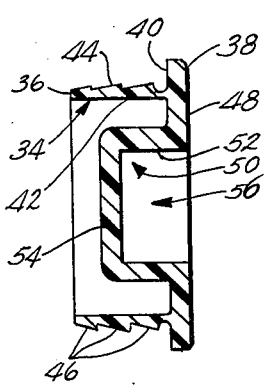
FIG. 7 is a cross-sectional view of the end cap taken generally along line VII—VII of FIG. 6.
Figure 8:
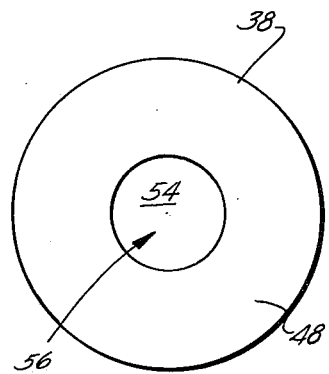
FIG. 8 is a front, elevational view of the end cap of FIG. 6.

End cap 30 is best seen in FIGS. 6, 7 and 8. As shown therein, end cap 30 includes an axially directed hub portion 34 having an inner, flat end 36. Joined to hub 34 is an outward, radially extending, generally circular flange 38. Flange 38 includes a planar surface 40 which is perpendicular to the longitudinal or central axis of hub 34. Hub 34 includes an inner surface 42 and an outer surface 44. Formed on outer surface 44 are a plurality of circumferentially extending, axially spaced barbs 46. In the embodiment illustrated in FIGS. 6-8, flange 38 includes an inner portion 48 which extends radially inwardly towards the axis of the end cap. Portion 48 is joined integral with a cup-shaped portion 50 having a peripheral sidewall 52 and a planar bottom wall 54. Cup member 50 defines an outwardly opening, cylindrical recess 56. Recess 56 is adapted to receive in a pressfit fashion a bearing insert as disclosed in the aforementioned commonly owned U.S. patent application Ser. No. 941,176, now U.S. Pat. No. 4,213,523.

Figure 9:
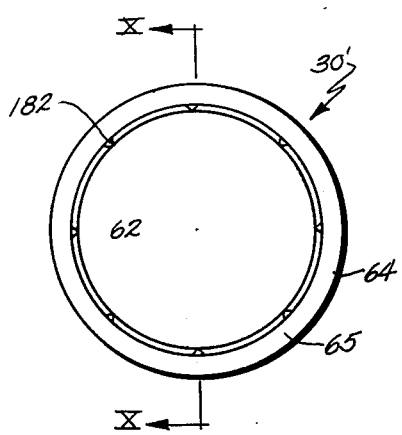
FIG. 9 is a rear, elevational view of an alternative form of end cap in accordance with the present invention.
Figure 10:
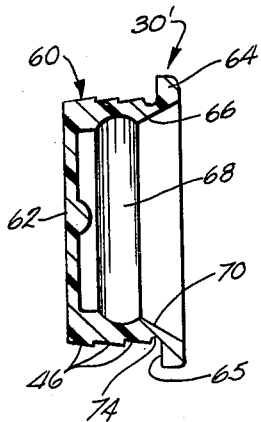
FIG. 10 is a cross-sectional view of the end cap taken generally along line X—X of FIG. 9.
Figure 11:
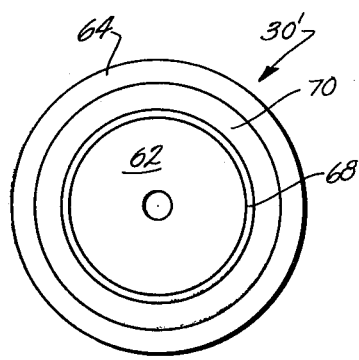
FIG. 11 is a front, elevational view of the end cap of FIG. 9.

An alternative end cap generally designated 30' is illustrated in FIGS. 9, 10 and 11. End cap 30' is generally cup-shaped and includes a peripheral sidewall 60 which defines an axially extending hub portion. Sidewall 60 is integral with a bottom wall 62 at its inner end. As with end cap 30, end cap 30' also includes an outer, radially extending flange designated 64 having an inner, planar surface 65. Sidewall 60 includes an inner peripheral surface 66 which defines a circumferentially extending groove 68 and a chamfered or beveled surface 70. End cap 30' is adapted to receive a ball bearing assembly. Groove 68 is an outer raceway for the bearing assembly. Sidewall portion 60, as with embodiment 30, includes a plurality of circumferentially extending, axially spaced barbs 46.

Figure 12:
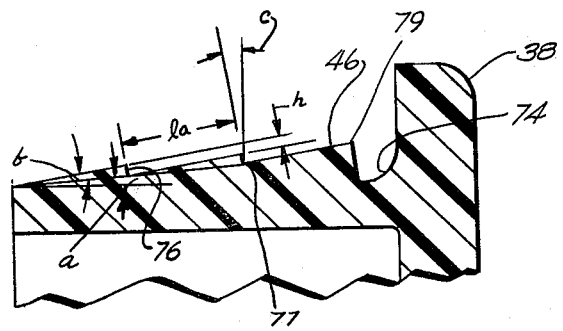
FIG. 12 is a greatly enlarged, fragmentary, cross-sectional view of an end cap in accordance with the present invention showing the configuration of the barbs and hub thereof.

As best seen in FIG. 12, it is presently preferred that the outer surface of hub 44 of cap 30 and sidewall 60 of cap 30' be tapered from their inner ends towards outer radial flanges 38, 64 at a lead taper angle generally designated "a". In the presently preferred embodiment, lead taper angle "a" is 5°. Also, it is presently preferred that each of the barbs 46 be similarly tapered in the same direction as the taper of the hub. In the preferred embodiment, three barbs 46 are provided. The barbs are tapered along a barb taper angle generally designated "b" which is preferably 10°. It is also preferred that the hub portions define a circumferentially extending groove 74 immediately adjacent outer radial flanges 38, 64. As explained below, groove 74 serves as a flash trap and increases the mechanical bond between the end caps and the roller tube. As seen in FIG. 12, since the barbs are tapered from the base line taper of the hub, they include an angled surface 76 which has an angle "c" from vertical. In this preferred embodiment of the invention, the angle "c" is approximately 5°. Each barb has a length "l" of from one-tenth to one-fourteenth of the roller tube diameter. Also, each barb has a height "h" of from one-tenth to one-fourteenth of the length "l". In this preferred embodiment, with a roller tube diameter of 2.375 inches, each barb has a length "l" of approximately 0.180 inches and a maximum height "h" from a leading edge 77 to a trailing edge 79 of 0.016 inches. As explained more fully below, the hub and barb construction of the end caps retain melting roller material and result in a strong mechanical interconnection between the end cap and roller tube.

In order to use ultrasonic insertion techniques, Applicant has discovered that the end caps must be formed from a dissimilar thermoplastic material from that of the rollers. Specifically, Applicant has discovered that a crystalline thermoplastic should preferably be used and that the material selected have a melting temperature of at least 50° F. higher than the melting temperature of the roller material. Crystalline thermoplastics have a higher and more narrowly defined melting temperature than the aforementioned amorphous thermoplastics. As a result, the end cap will effectively transmit ultrasonic vibrations to the roller tube resulting in generation of frictional heat which will melt the roller tube material without any melting of the end cap.

It is presently preferred that the end cap be injection molded from a crystalline thermoplastic such as acetal homopolymer. A suitable material has been found to be that sold under the brand name Delrin by DuPont Company and designated Grade 900F. This grade of acetal homopolymer has a melting temperature of 347° F. and also has the desired strength and chemical resistance characteristics. Further, the material is a low friction, self-lubricating material making it excellent for end cap 30' which defines a raceway for metal ball bearing elements.

The end caps are dimensioned so that the leading barb immediately adjacent end 36 of embodiment 30, for example, has a slip fit with the inner peripheral surface of the roller tube 32. Since the barbs and the hub are tapered, successive barbs increase the diameter resulting in increased contact with the inner peripheral surface or inner diameter of the tube. At least some of the barbs must have an interference fit with the tube and be of a greater outer diameter than the inside diameter of the tube. The selection of materials for the roller tube and the end cap and the specific configuration of the barbs provide the results obtained by the present invention and permit the end cap to be ultrasonically inserted and mechanically interconnected with the tube. Heretofore, ultrasonic insertion techniques have commercially been limited to insertion of metal inserts into plastic materials. Ultrasonic assembly of plastics has typically been employed with like grade thermoplastic materials and then through welding techniques. which result in a chemical or molecular bond. The use of a crystalline thermoplastic material for the end cap having a melting temperature of at least approximately 50° F. greater than that of the amorphous thermoplastic roller tube material has been found to provide the desired results and ease of assembly.

CLAMP OR HOLDING MEANS

In assembling the end caps and the tubular roller, a tube 32 is initially positioned on base 12, as seen in FIG. 1. Supported on base 12 is a lower fixture 80 which includes a generally circular recess 82 having an inside diameter slightly larger than the outside diameter of the roller tube 32. Recess 82 positions tube 32 in coaxial alignment with horn 20 and holds the tube against axial movement. Tube 32 is placed within the clamp or holding means 18.

Figure 13:
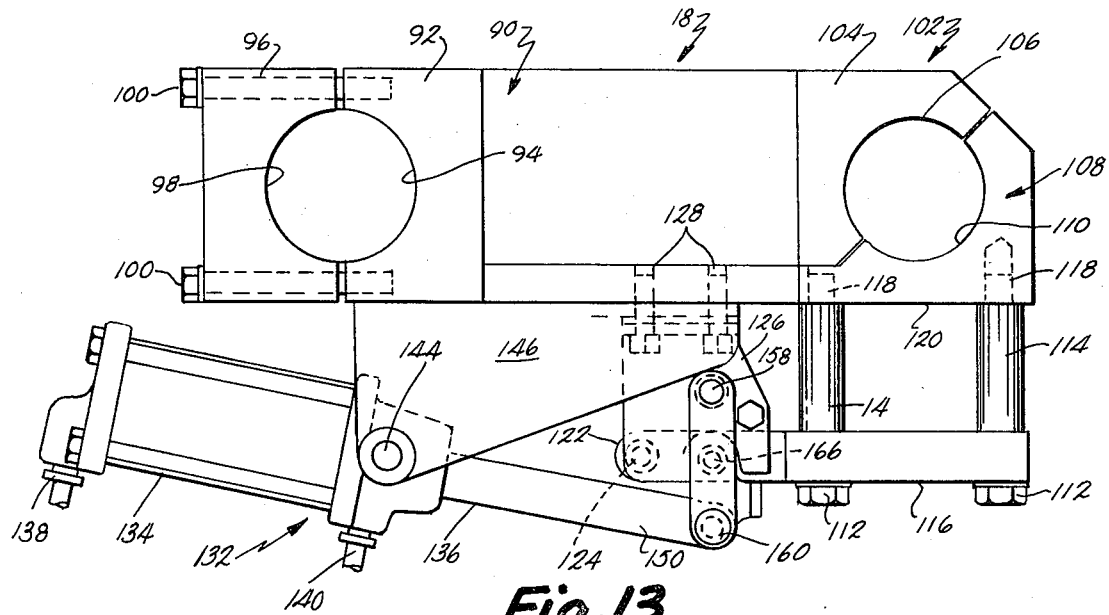
FIG. 13 is a top, plan view of the clamping or holding means incorporated in the assembly apparatus in accordance with the present invention.
Figure 14:
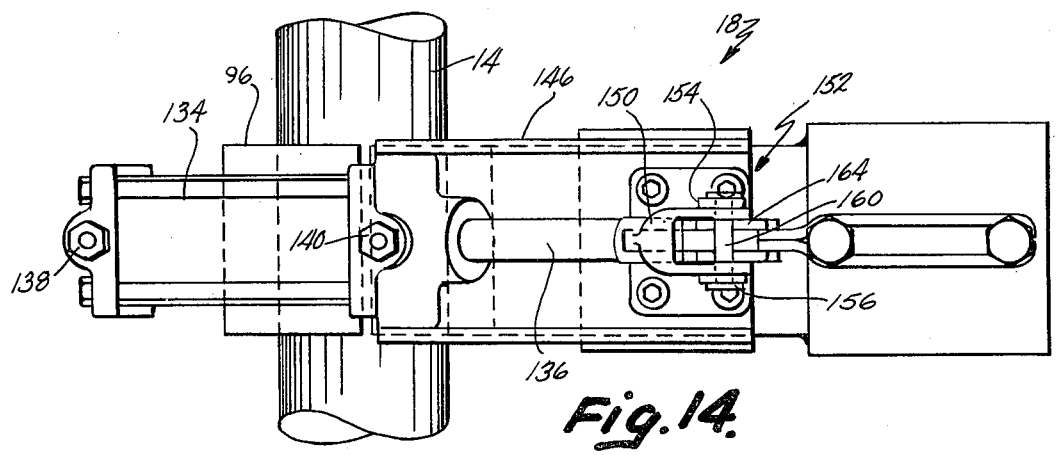
FIG. 14 is a side, elevational view of the clamping means of FIG. 13.

As best seen in FIGS. 13 and 14, holding means 18 includes a support fixture 90 which is clamped in position on support post 14. Fixture 90 defines a first member 92 having a generally semicircular recess 94. A second member 96 also defines a semicircular recess 98. Member 96 is moved towards member 92 by suitable clamping bolts 100. Fixture 92 may therefore be positioned on support post 14 by removing member 96 from member 92, placing recess 94 on post 14 and then securing member 96 to member 92.

Fixture 90 also supports a clamp element generally designated 102. Clamp element 102 includes a first jaw 104 formed as part of fixture 90. Jaw 104 defines a semicircular recess 106. Recess 106 has a radius which is equal to the radius at the outer surface of tube 32.

A second or movable jaw 108 is supported on fixture 90 for movement towards and away from jaw 104. Jaw 108 also includes a recess 110. When the jaws 104, 108 are in the position illustrated in FIG. 13, recesses 106, 110 define a cylindrical bore having a diameter equal to the outer diameter of the roller tube 32. Movable jaw 108 is secured by bolts 112 and spacers 114 to an elongated pivotal link 116. Bolts 112 thread into threaded apertures 118 opening through the side 120 of jaw 108. Elongated link 116 is pivoted at an end 122 by a pivot pin 124 to a bracket 126. Bracket 126 is in turn secured by bolts 128 to fixture 90.

Jaw 108 is pivoted and a clamping force is generated by an actuator means generally designated 132. Actuator means 132 includes a fluid actuator piston cylinder assembly 134. A rod 136 is reciprocated by assembly 134. Assembly 134 includes a double acting piston, and a suitable fluid for extension and retraction of the rod enters the cylinder at fittings 138, 140. Assembly may be pneumatically or hydraulically actuated. Piston cylinder assembly 134 is pivotally mounted at its forward end by a pivot pin 144 to a weldment or bracket 146 which in turn is supported by fixture 90. A yoke 150 is threadably secured to the forward end of actuator rod 136. Yoke 150 connects actuator rod 136 to a toggle means 152. Toggle means 152 includes outer or upper and lower links 154, 156, respectively. Links 154, 156 are pivoted at a common point to bracket plate 126 by a pivot pin 158. The opposite ends of the links are pivoted by a common pivot pin 160 to the yoke 150. An internal link 164 is also pivoted to yoke 150 at one end by pivot pin 160. The opposite end of internal link 164 is pivoted to the elongated pivoted link 116 by a pivot pin 166.

As should be readily apparent, upon extension of rod 136, link 116 will be pivoted through toggle action of links 154, 156 and 164 to the closed clamping and holding position as shown in FIG. 13, for example. Upon retraction of the rod 136, outer or upper and lower links 154, 156 will pivot in a clockwise direction when viewed in FIG. 13 and internal link 164 will pivot elongated link 116 so that jaw 108 moves away from jaw 104.

ASSEMBLY

Figure 3:
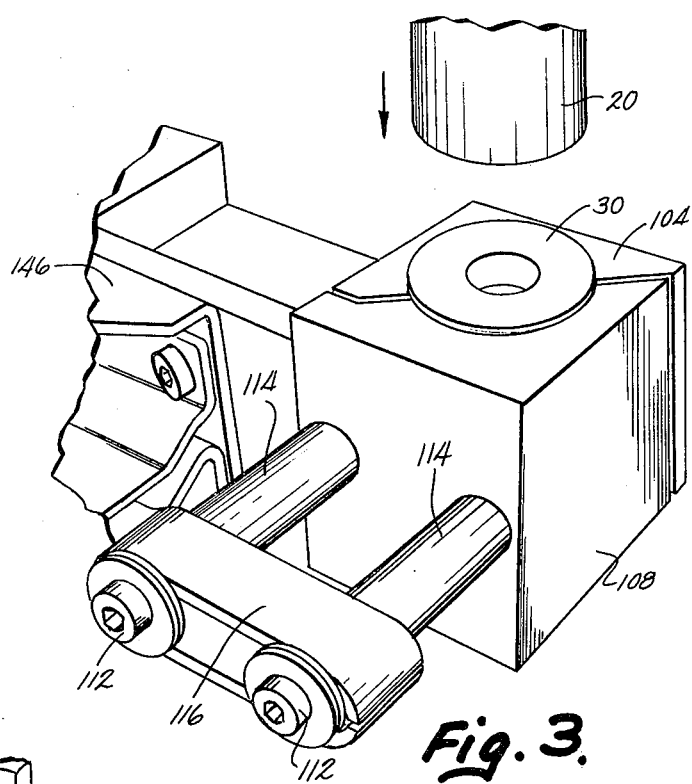
FIG. 3 is a greatly enlarged view showing the roller tube and end cap held by clamping means just prior to ultrasonic insertion of the cap into the roller.
Figure 4:
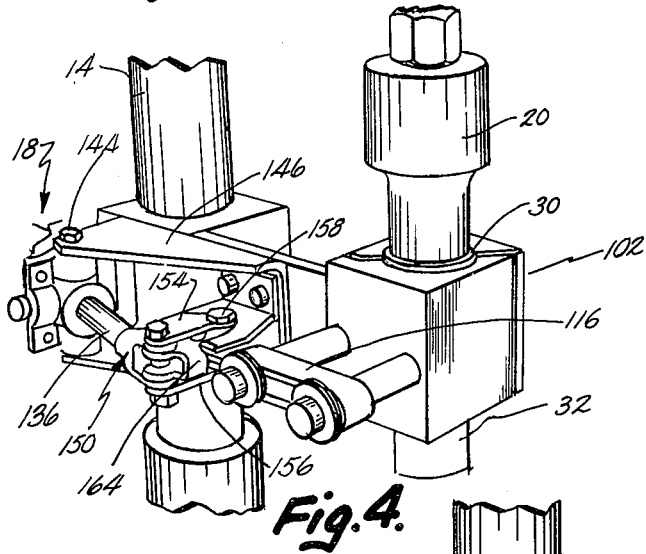
FIG. 4 is a fragmentary, perspective view of the apparatus of FIG. 1 showing the end cap being ultrasonically inserted into the roller tube.
Figure 2:
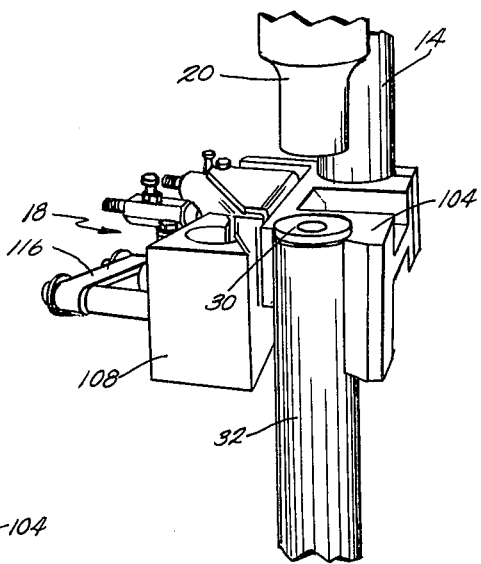
FIG. 2 is a fragmentary, enlarged view showing the roller tube and end cap positioned in a clamp or holding means of the apparatus and coaxially aligned with an ultrasonic vibrator.

To assemble a roller in accordance with the present invention, the particular length of roller tube 32 is selected. A length is selected so that the tube will extend between the side supports of the conveyor. The ends of the tube need merely be cut square and straight, and no special end preparation is required. The length of tube 32 is then positioned on fixture 80 within recess 82 and the upper end of the tube, as viewed in FIG. 1, for example, is placed within recess 106 of jaw 104. Fixture 90 is positioned on support post 40 so that the upper open end of tube 32 is disposed within the cylindrical bore defined by the jaws and below the top surfaces of the jaws. An end cap 30 or 30' is then loosely disposed in the open end of the tube 32, as clearly seen in FIG. 2. Initial centering of the cap is accomplished by the tapered configuration of the hub of the end cap. Piston cylinder assembly 134 is then actuated to shift jaw 108 from its open position to a closed position engaging and holding tube 32. It is presently preferred that the tube be clamped with a clamping force of approximately 1,000 lbs. Next, the ultrasonic insertion device 16 is activated. Horn 20 is shifted downwardly by device 16 into contact with the radial flange of the end cap. These steps in the assembly process are illustrated in FIGS. 3 and 4.

Horn 20 imparts ultrasonic vibrations in an axial direction to the end cap 30. Also, the horn exerts a constant pressure or force on the end cap tending to drive it in an axial direction and into the tube. Frictional heat is generated at the interface of the barbs and the tube inner peripheral surface. The frictional heat melts a thin layer of the tube material. Since constant pressure is exerted on the end cap, it moves further into the tube and additional layers of the inner surface of the tube material are melted. This melted material flows between the barbs as the end cap advances and resolidifies. The series of tapered, increasingly larger in diameter barbs 46 effectively generate a continuous layer of melting material which resolidifies and remelts until the end cap has traveled all the way into the tube and the outer radial flange 38 contacts or abuts the end of the tube. Ultrasonic vibration is then ceased and the horn is moved out of contact with the end cap in accordance with a preselected cycle or sequence. The melted material cools and resolidifies. The jaws 104, 108 serve as a heat sink dissipating heat and increasing the rate of resolidification. The jaws enhance the mechanical trapping of the barbs in the roller tube.

Initial centering of the end cap within the tube is provided by the tapered configuration of the hub. Final centering, however, is accomplished by aligning the outside diameter surfaces of the tube and the end cap. As previously noted, the upper end of the tube is disposed within the cylindrical bore defined by the jaws. As the end cap is forced downwardly by the insertion device, the outer peripheral surface of radial flange 38 will come into contact with the bore defined by the jaws. The jaws therefore guide the end cap into a concentric position with the outside of the tube, and the axes of the end cap and the tube are coincident. As previously noted, the inner peripheral surface of the tube, due to the method of manufacture which typically is an extrusion process, does not have a constant wall thickness. The frictional heat generated by the ultrasonic vibrations melts the roller tube material, and the end cap may shift radially in the roller tube so that its axis is translated until it is concentric with the roller tube due to the guiding and centering of the clamp means. The method, therefore, overcomes previous problems experienced with extruded plastic tubes with varying wall thicknesses and eccentric inside surfaces.

Figure 15:
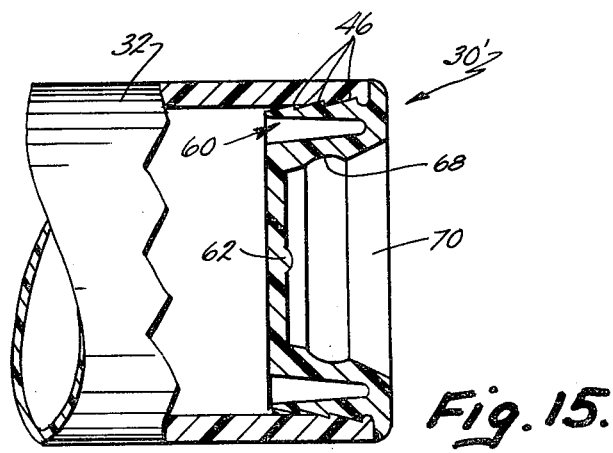
FIG. 15 is a fragmentary, partially sectioned, elevational view of a conveyor roller subassembly in accordance with the present invention.

A mechanically interconnected end cap and roller are illustrated in FIG. 15. As shown therein, the roller material is melted and resolidified so as to be disposed within the spaces defined by the axially positioned, circumferentially extending barbs 46. The first barb on the cap is dimensioned to enter the tube with a slip fit and provide nominal first or initial centering of the cap within the tube. The first barb also provides a barrier against the forward flow of the melting roller material. the second barb in the series provides an interference fit with the inside of the tube. This interference fit is accomplished by dimensioning the maximum diameter of the barb greater than the nominal internal diameter of the tube. The barb after melting and resolidifying of the tube material provides positive retention. The melting material displaced by the second barb may travel forward but is trapped behind the first barb, as shown in FIG. 15. Further, this melting material may travel rearwardly and resolidify in the space between the second and third barbs as the second barb is advanced inwardly into the tube. The third barb which has a greater diameter than the second barb functions in a similar manner and provides increased retention displacing additional melting material. This additional material flows around the third barb and into the flash trap defined by the circumferential groove 74 of the end cap. The amount of melting material which will be displaced is readily computable given the dimensions of the end cap and the tube. The flash trap is dimensioned so that all excess melt will be trapped and excess squeeze-out or flash will be prevented.

Clamp means 18 is readily adaptable to assemble different diameter tubes and caps. Semicircular-shaped spacers (not shown) may be placed in the recesses defined by jaws 104, 108 to reduce the inner diameter of the base defined by the clamps. Removal of the spacers will, of course, increase the diameter. The spacers are dimensioned to provide the proper sized bore for the tube and cap being assembled.

In one existing embodiment of the roller assembly in accordance with the present invention, the tube is fabricated from a high impact, ABS material and has a $2\frac{3}{8}$ inch OD, 2 inch schedule 40 plastic pipe size. End cap 30 at flange 38 has a maximum outside diameter of 2.375 inches. The end cap has an overall axial length of 0.75 inches and the flange has an axial thickness of 0.12 inches. The minimum diameter of hub 44 at end 36 is 2 inches and the internal diameter of the hub is 1.90 inches. Bottom wall 54 has a diameter of 1 inch and an axial thickness of 0.12 inches. The maximum axial length of the end cap 30 from the interface of wall 54 to the outer surface of flange 38 is 0.50 inches. As previously stated, the barbs each have a taper angle of 10° from the end cap centerline. The lead taper angle is 5° on the hub outer surface. The barbs have a length of 0.180 inches and a maximum height of 0.016 inches. The flash trap groove is defined by a 0.06 inch radius having a center adjacent the trailing edge of the third barb.

When a cap 30' is used, it is preferred that the ball bearing structure be dimensioned to snap fit within the recess defined by the cap. The crystalline thermoplastic material from which the cap 30' is fabricated is a lubricious, low friction material which provides an excellent outer raceway for the bearing assembly. As described below, it is preferred that the ball bearing assembly be of a wide open design permitting easy flush-out, with no cage or other impediments, and which is self-draining.

As illustrated in FIG. 9, each of the end caps 30 or 30' may be provided with axially directed grooves 67 or serrations positioned at equally spaced intervals around the circumference of the barb. When the melting material resolidifies within these serrations or grooves, rotational stability to the end cap tube combination results.

COMPLETED ROLLER ASSEMBLIES

Figure 16:
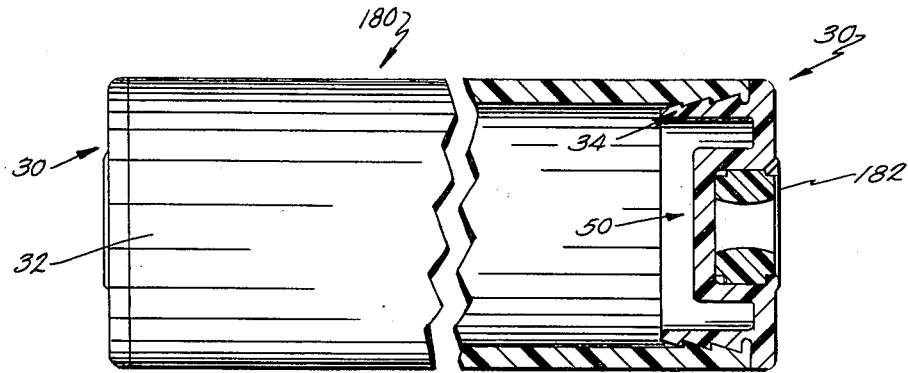
FIG. 16 is a fragmentary, partially sectioned, elevational view of a completed conveyor roller assembly including a bearing insert.
Figure 17:
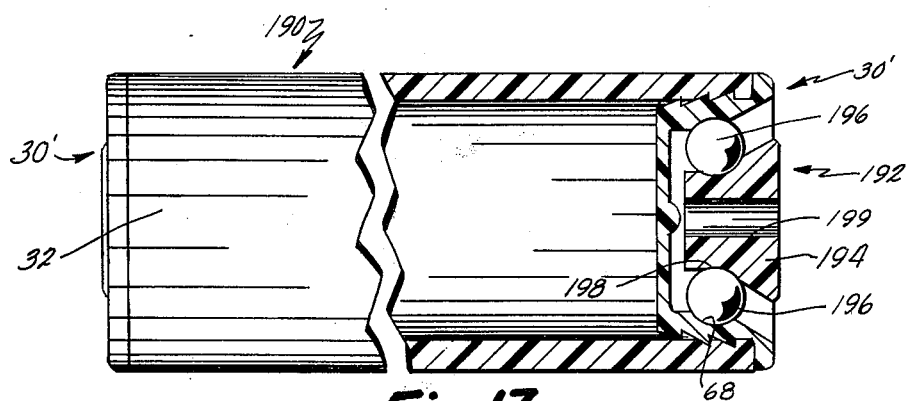
FIG. 17 is a fragmentary, partially sectioned, elevational view of a completed conveyor roller assembly including a ball bearing assembly.
Figure 18:
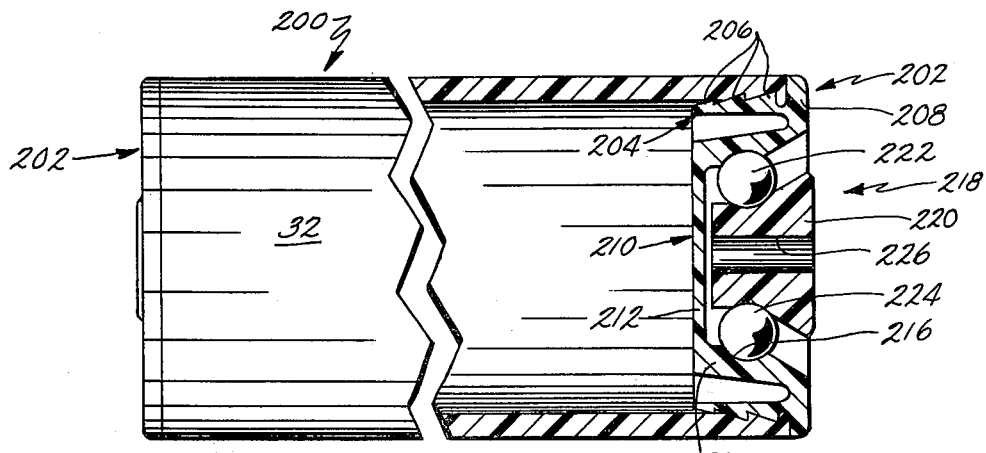
FIG. 18 is a fragmentary, partially sectioned, elevational view of a completed conveyor roller assembly including a further alternative end cap and ball bearing assembly.

Completed roller assemblies in accordance with the present invention are illustrated in FIGS. 16, 17 and 18. FIG. 16 illustrates an assembly generally designated 180. Assembly 180 includes a roller tube 32 having its ends closed by end caps 30. As described above, each end cap 30 is ultrasonically inserted into the open end of roller tube 32. A mechanical interconnection is achieved between hub portion 34, cap 30 and the tube. Cup shaped portion 50 receives therein a bearing insert generally designated 182. The bearing insert is of the type disclosed in the aforementioned U.S. Pat. No. 4,213,523. The insert is adapted to receive a stub shat which supports the roller assembly on a conveyor support structure.

FIG. 17 illustrates a completed conveyor roller assembly generally designated 190. Assembly 190 similarly includes a roller tube 32 which is closed by end cap 30'. End cap 30' receives a ball bearing assembly generally designated 192. Bearing assembly 192 includes an inner race defining member 194 and a plurality of stainless steel ball elements 196. Elements 196 ride on an inner race 198 defined by member 194 and on the outer race 68 defined by the end cap 30'. Member 194 further defines a central bore 199. Bore 199 receives a stub shaft which supports the roller assembly on a conveyor structure. As is clear from FIG. 17, the ball bearing assembly is open for ease of cleaning. The bearing assembly may be easily and readily flushed during cleaning operations. The cleaning solution readily enters and drains between ball elements 196 and through bore 199.

FIG. 18 illustrates a still further embodiment of a completed roller assembly in accordance with the present invention. The roller assembly in FIG. 18 is generally designated 200. Assembly 200 similarly includes a roller tube 32. Tube 32 is closed at each end, in accordance with the assembly techniques described above, by an alternative end cap generally designated 202. Alternative end cap 202 includes a hub defining portion 204 having a plurality of barbs 206 formed thereon. The barbs 206 are identical to barbs 46 illustrated in FIG. 12. End cap 202 further defines an outwardly extending radially directed flange 208. Flange 208 has an outer diameter substantially equal to the outer diameter of roller tube 32. Flange 208 extends radially inwardly and is joined with a cup-shaped portion 210. Portion 210 includes a base or bottom wall 212 and a peripheral sidewall 214. Peripheral sidewall 214 defines an outer raceway 216. End cap 202 is adapted to receive a ball bearing assembly generally designated 218. Assembly 218 includes an inner raceway defining member 220 and a plurality of ball bearing elements 222. Inner raceway defining member 220 is of the same configuration as member 194 illustrated in FIG. 17. Member 220 defines an inner raceway 224. The balls 222, which are preferably fabricated from stainless steel, ride on raceways 216 and 224. Member 220 also includes a through bore 226 adapted to receive a stub shaft on a conveyor structure.

With each of the completed roller assemblies illustrated in FIGS. 16, 17 and 18, the end caps are mechanically interconnected to the elongated roller tubes 32. The mechanical interconnection is achieved by the ultrasonic insertion method described in detail above. The bearing insert 182 and the ball bearing assemblies 192, 218 may be assembled or added to their respective end caps prior to ultrasonic insertion of the caps into the roller tube end. In the alternative, they may be added after insertion of the end caps. The ball bearing structures 192, 218 are adapted to snap fit within the recesses defined by their respective end caps. The inner raceway defining members are fabricated from a lubricious, low friction material and may be of the same material as that of the end caps. The ball bearing assemblies, as clearly illustrated, are of a wide open design permitting easy flush-out. The assemblies do not include any cage structure or other impediments and are self-draining.

The conveyor roller and mother of manufacturing in accordance with the present invention provides a completely sealed roller assembly which eliminates cracks, crevices and the like which could retan contaminants and result in undesired bacterial build up. Further, the thermoplastic materials selected provide the necessary load carrying capacity, are resistant to corrosive materials, yet are readily cleanable with hot water solutions. The end caps are positively retained due to the mechanical interconnection between the tubes and the caps. The strong interconnection increases the reliability of the roller assembly. The assembly is rapid, economical and readily accomplished by relatively unskilled operators after minimal training. Further, the equipment is readily adaptable to an automated process. The ultrasonic insertion device 16 and the clamp structure 18 may be interconnected to operate sequentially on an automatic basis. Further, it should be understood that another ultrasonic insertion device could be supported on a support post 14 or by other means or in other arrangements so that both ends of the tube are closed simultaneously. Also, the devices could be equipped with automatic parts feeding and handling equipment for the automatic assembly of rollers. In this manner, great economies can be realized through automatic operation of the equipment.

The design and proportioning of the barbs is important. If the barbs are too small or too few, with respect to the roller diameter, they may not be strong enough to resist the forces of thermal expansion and contraction and externally applied loadings. If the barbs are too large or too numerous, with respect to the roller diameter, they may require excessive ultrasonic energy for insertion, thereby distorting or melting the plastic parts and they may displace excessive material, thereby preventing complete insertion or causing squeeze-out of excess melted material.

Other optimum shapes and numbers of barbs may similarly be determined by the proportions and principles exemplified in this preferred embodiment.

The above description should, therefore, be considered as that of the preferred embodiment. The true spirit and scope of the present invention may be determined by reference to the appended claims.

The embodiments of the invention in which an exclusive property or privilege is claimed are defined as follows:

1. An end cap adapted for ultrasonic insertion into an end of a thermoplastic conveyor roller tube having an outside diameter so that the end cap and roller tube are mechanically interconnected, said end cap comprising:
    a molded crystalline thermoplastic body, said body defining:
    an axially extending hub, said hub being tapered along at least a portion thereof from an inner end to an outer end along an outer peripheral surface;
    an outer flange extending radially outwardly from the outer peripheral surface of said hub; and
    a plurality of tapered, axially spaced barbs, each barb extending around substantially the entire outer peripheral surface of said hub, said barbs being axially positioned between said inner end of said hub and said outer flange, said body further defining a circumferential groove opening through said outer peripheral surface between said inner end and adjacent said outer flange and wherein said outer flange has an outer diameter greater than the maximum diameter of said barbs.

2. An end cap as defined by claim 1 wherein each of said barbs has a length "l" of from one-tenth to one-fourteenth of the roller tube diameter and each of said barbs has a height "h" of from one-tenth to one-fourteenth of the length "l".

3. An end cap as defined by claim 1 wherein said body further defines a generally cup-like opening adapted to receive a bearing insert.

4. An end cap as defined by claim 1 wherein said body is generally cup-like in shape and further includes an inner end wall integral with said hub inner end, said hub having an inner peripheral surface defining a bearing outer raceway, whereby said end cap is adapted to receive a plurality of ball elements and an inner raceway defining member.

5. An end cap as defined by claim 1 wherein said hub outer surface has a lead taper angle of 5°.

6. An end cap as defined by claim 1 wherein each of said tapered barbs has a taper angle of 10°.

7. An end cap as defined by claim 2 wherein said hub outer surface has a lead taper angle of 5°.

8. An end cap as defined by claim 7 wherein each of said tapered barbs has a taper angle of 10°.

9. An end cap as defined by claim 3 wherein said hub outer surface has a lead taper angle of 10°.

10. An end cap as defined by claim 9 wherein each of said tapered barbs has a taper angle of 5°.

11. An end cap as defined by claim 1 wherein said body is molded from the crystalline thermoplastic resin as a one-piece member.

12. An end cap as defined by claim 8 wherein said body is molded from the crystalline thermoplastic resin as a one-piece member.

13. An end cap as defined by claim 10 wherein said body is molded from the crystalline thermoplastic resin as a one-piece member.

14. An end cap as defined by claim 1 wherein said body defines at least three equally spaced barbs, and each of said barbs has a length of approximately 0.180 inches and a maximum height of approximately 0.016 inches.

15. An end cap as defined by claim 12 wherein said body defines at least three equally spaced barbs, and each of said barbs has a length of approximately 0.180 inches and a maximum height of approximately 0.016 inches.

16. An end cap as defined by claim 13 wherein said body defines at least three equally spaced barbs, and each of said barbs has a length of approximately 0.180 inches and a maximum height of approximately 0.016 inches.

17. An end cap as defined by claim 3 further including a bearing insert retained within said cup-like opening.

18. An end cap as defined by claim 4 further including an inner raceway defining member and a plurality of ball elements.

19. A thermoplastic conveyor roller assembly adapted for sanitary uses, said roller assembly comprising:
    a thermoplastic, cylindrical tubular roller having a central axis, and outer diameter, an inner diameter and an open end;
    an ultrasonically inserted end cap formed of a thermoplastic material having a greater melting temperature than that of said thermoplastic roller, said end cap disposed within and closing off said open end of said roller and being mechanically interconnected with said roller, said end cap including:
    a body defining an axially extending hub and an outer radial flange dimensioned to abut the open end of said roller, said hub including a plurality of tapered, axially spaced, circumferential barbs, said barbs defining a plurality of spaced circumferential grooves extending around said body, said roller defining melted and resolidified portions disposed in said grooves after melting and resolidifying of said roller due to ultrasonic insertion of said end cap into said open end of said roller.

20. A thermoplastic conveyor roller assembly as defined by claim 19 wherein each of said barbs has a length "l" of from one-tenth to one-fourteenth of the tubular roller outer diameter and each of said barbs has a height "h" of from one-tenth to one-fourteenth of the length "l".

21. A thermoplastic conveyor roller as defined by claim 19 wherein said hub is tapered from an inner end to an outer end adjacent an inner surface of said outer, radial flange and wherein each of said barbs is tapered in the same direction of taper as said hub.

22. A thermoplastic conveyor roller as defined by claim 21 wherein at least some of said barbs are dimensioned to have an interference fit with the inner diameter of said roller prior to melting and resolidifying of said roller and wherein the barb closest to said hub inner end is slipfitted and fits inside the roller with a slip fit.

23. A thermoplastic conveyor roller as defined by claim 22 wherein said hub defines an undercut groove adjacent the inner surface of said outer flange, said groove retaining melted and resolidified roller material and serving as a flash trap.

24. A thermoplastic conveyor roller as defined by claim 20 wherein said end cap hub is tubular and includes an inner peripheral surface and wherein said flange extends radially inwardly and is joined to a cup-like member which has a cylindrical sidewall and a bottom wall, said member having a central axis coincident with the central axis of said roller, said member opening through an outer end of said cap and adapted to receive a bearing.

25. A thermoplastic conveyor roller as defined by claim 20 wherein said end cap is generally cup-like in shape having a sidewall defining said hub and a bottom wall joined to an inner end of said sidewall, said sidewall having an inner peripheral surface defining a bearing outer raceway.

26. A thermoplastic conveyor roller as defined by claim 20 wherein said end cap is formed from a thermoplastic having a melting temperature at least approximately 50° F. greater than the melting temperature of said roller.

27. A thermoplastic conveyor roller as defined by claim 20 wherein said roller is a high impact amorphous thermoplastic and said end cap is a crystalline thermoplastic.

28. A thermoplastic conveyor roller as defined by claim 27 wherein said roller is a high impact ABS thermoplastic and said end cap is an acetal homopolymer resin.

29. A thermoplastic conveyor roller as defined by claim 23 wherein said hub has a lead taper angle of approximately 5° and wherein each of said barbs has a taper angle of approximately 10°.

30. A thermoplastic conveyor roller as defined by claim 23 wherein said roller is a high impact ABS thermoplastic and said end cap is an acetal homopolymer resin.

31. A thermoplastic conveyor roller as defined by claim 24 wherein said hub is tapered from an inner end to an outer end adjacent an inner surface of said outer, radial flange and wherein each of said barbs is tapered in the same direction of taper as said hub.

32. A thermoplastic conveyor roller as defined by claim 31 wherein at least some of said barbs are dimensioned to have an interference fit with the inner diameter of said roller prior to melting and resolidifying of said roller and wherein the barb closest to said hub inner end is slipfitted and fits inside the roller with a slip fit.

33. A thermoplastic conveyor roller as defined by claim 32 wherein said hub defines an undercut groove adjacent the inner surface of said outer flange, said groove retaining melted and resolidified roller material and serving as a flash trap.

34. A thermoplastic conveyor roller as defined by claim 33 wherein said end cap is formed from a thermoplastic having a melting temperature at least approximately 50° F. greater than the melting temperature of said roller.

35. A thermoplastic conveyor roller as defined by claim 33 wherein said roller is a high impact amorphous thermoplastic and said end cap is a crystalline thermoplastic.

36. A thermoplastic conveyor roller as defined by claim 35 wherein said roller is a high impact ABS thermoplastic and said end cap is an acetal homopolymer resin.

37. A thermoplastic conveyor roller as defined by claim 35 wherein said hub has a lead taper angle of approximately 5° and wherein each of said barbs has a taper angle of approximately 10°.

38. A thermoplastic conveyor roller as defined by claim 25 wherein said hub is tapered from an inner end to an outer end adjacent an inner surface of said outer, radial flange and each of said barbs is tapered in the same direction of taper as said hub.

39. A thermoplastic conveyor roller as defined by claim 38 wherein at least some of said barbs are dimensioned to have an interference fit with the inner diameter of said roller prior to melting and resolidifying of said roller and wherein the barb closest to said hub inner end fits inside the roller with a slip fit.

40. A thermoplastic conveyor roller as defined by claim 39 wherein said hub defines an undercut groove adjacent the inner surface of said outer flange, said groove retaining melted and resolidified roller material and serving as a flash trap.

41. A thermoplastic conveyor roller as defined by claim 40 wherein said end cap is formed from a thermoplastic having a melting temperature at least approximately 50° F. greater then the melting temperature of said roller.

42. A thermoplastic conveyor roller as defined by claim 41 wherein said roller is a high impact amorphous thermoplastic and said end cap is a crystalline thermoplastic.

43. A thermoplastic conveyor roller as defined by claim 42 wherein said roller is a high impact ABS thermoplastic and said end cap is an acetal homopolymer resin.

44. A thermoplastic conveyor roller as defined by claim 43 wherein said hub has a lead taper angle of approximately 5° and wherein each of said barbs has a taper angle of approximately 10°.

45. A theroplastic conveyor roller as defined by claim 37 wherein said body defines at least three equally spaced barbs, and each of said barbs has a length of approximately 0.180 inches and a maximum height of approximately 0.016 inches.

46. A thermoplastic conveyor roller as defined by claim 44 wherein said body defines at least three equally spaced barbs, and each of said barbs has an axial length of approximately 0.180 inches and a maximum height of approximately 0.016 inches.

47. A thermoplastic conveyor roller as defined by claim 24 further including a bearing insert disposed within said cup-like member.

48. A thermoplastic conveyor roller as defined by claim 25 further including a member defining an inner raceway and a plurality of ball elements riding on said inner raceway and said outer raceway.

* * * * *

UNITED STATES PATENT AND TRADEMARK OFFICE
CERTIFICATE OF CORRECTION

PATENT NO. : 4,441,601
DATED : April 10, 1984
INVENTOR(S) : William R. Rood

It is certified that error appears in the above-identified patent and that said Letters Patent is hereby corrected as shown below:

Abstract, line 10:
    "havig" should be --having--;

Column 2, line 51:
    "roller the" should be --roller tube--;

Column 6, line 33:
    Delete ".";

Column 8, line 56:
    "the" should be --The--;

Column 9, line 66:
    "shat" should be --shaft--;

Column 10, line 62:
    "mother" should be --method--;

Column 10, line 65:
    "retan" should be --retain--;

UNITED STATES PATENT AND TRADEMARK OFFICE
CERTIFICATE OF CORRECTION

PATENT NO. : 4,441,601

DATED : April 10, 1984

INVENTOR(S) : William R. Rood

It is certified that error appears in the above-identified patent and that said Letters Patent is hereby corrected as shown below:

Column 12, line 56:

"and outer" should be --an outer--; and

Column 14, line 62:

"theroplastic" should be --thermoplastic--.

Signed and Sealed this

Thirteenth Day of November 1984

[SEAL]

Attest:

GERALD J. MOSSINGHOFF

Attesting Officer

Commissioner of Patents and Trademarks